Dec. 22, 1959  W. E. NORTON  2,917,860
WEEDLESS FISH HOOKS
Filed April 1, 1957

INVENTOR.
Willard E. Norton
BY Shoemaker & Mattare
ATTYS

United States Patent Office 2,917,860
Patented Dec. 22, 1959

2,917,860

WEEDLESS FISH HOOKS

Willard E. Norton, Marion, Ind.

Application April 1, 1957, Serial No. 649,896

3 Claims. (Cl. 43—43.2)

This invention relates generally to the class of fishing and trapping and is directed particularly to improvements in fishing hooks, more especially hooks of the so-called weedless type.

Weedless fish hooks are well known, in which the hook is equipped with deflector fingers which are secured to the hook shank in such a way as to extend outwardly and across the plane of the hook bill. These weed deflectors conventionally are formed of a suitable thin resilient wire which is attached to the hook shank adjacent to the eye.

The hooks at present employed have the eye disposed in a plane passing through the side faces of the shank and in the operation of applying the wire member which is to form the weed deflector, the wire is extended through the eye and is then bent down against the front and back sides of the shank and is then secured adjacent to the eye by binding with leader material or by soldering. Following this operation the end portions, which have been bent down against the front and back of the shank, must then be twisted to position them at the lateral sides so that such ends will be in the proper position to be extended forwardly and downwardly in diverging relation with respect to the hook bill. In other words, in this operation of affixing the wire weed deflector to the hook, the end portion which lies at the back of the hook to be bent around to one side or bent toward the front of the hook and the other end portion of the wire which is secured to the shank has to be bent away from the front part of the shank to the other side and then the wire ends have to be bent to extend forwardly to the proper position with respect to the point of the hook.

Another object of the invention is to provide a new and improved weedless fish hook wherein the hook eye is disposed in a plane passing through the front and back of the hook shank or in the plane of the hook bill, whereby the application of the weed deflector wire is simplified and the amount of bending required to position the ends of the wire in the proper position with respect to the hook bill is reduced and consequently the possibility of weakening the wire is also reduced to a minimum.

The invention will be best understood from a consideration of the following detail description taken in connection with the accompanying drawing forming part of the specification, with the understanding, however, that the invention is not confined to a strict conforming with the showing of the drawing but may be changed or modified so long as such changes or modifications mark no material departure from the salient features of the invention as expressed in the appended claims.

Figure 1:
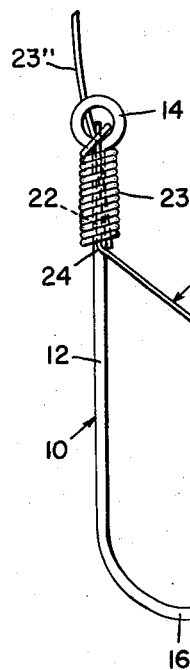
Fig. 1 is a view in side elevation of a weedless fish hook formed in accordance with the present invention.

Referring now more particularly to the drawing, the numeral 10 generally designates an improved fish hook which according to the present invention has the shank portion 12 provided with the eye 14 while the opposite end is bent into the conventional hook portion 16 which terminates in the point 18.

As hereinbefore stated, fish hooks conventionally have the eye portion to which the line is attached or to which a snell is attached, disposed to lie in a plane extending transversely of the plane of the shank and point. The present invention, however, contemplates the provision of a hook in which the eye, here designated 14, is turned 90° from the conventional position so as to lie in the plane of the hook point 18 and the shank 42. The side of the shank 12 nearest to the point will be referred to as the front of the shank and the opposite side will be referred to as the back of the shank, while the sides lying in a plane perpendicular to the plane of the hook point and the front and back sides will be referred to as the lateral sides or faces of the shank for convenience in describing the application of the weed deflector.

The numeral 20 generally designates the applied weed deflector. This deflector is formed of a single length of light, resilient wire and it is bent midway between its ends and extended through the eye 14 and has portions thereof adjacent to the bight, which is designated 21, lying against the opposite lateral faces of the shank. These short portions which lie against the lateral faces of the shank are designated 22 and are bound in position by suitable binding material which may be nylon thread, gut or wire, as desired, the binding being designated 23.

Figure 2:
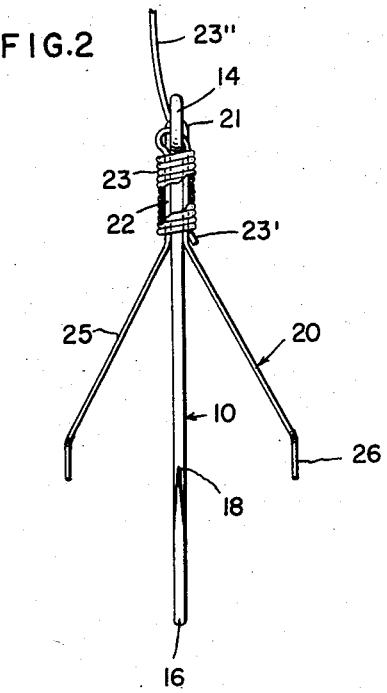
Fig. 2 is a view in front elevation of the same.

At the lower end of the binding 23 which wraps the short portions 22 of the two ends of the wire against the shank, the wire is bent as indicated at 24 to form the long deflector fingers 25 which extend forwardly and in divergent relation as shown in Fig. 2 and short terminal portions of the fingers are bent downwardly as indicated at 26 to substantially parallel the upturned end of the hook and these terminal portions lie a substantial distance forwardly from the hook point and are widely spaced apart on opposite sides of the point.

Figure 3:
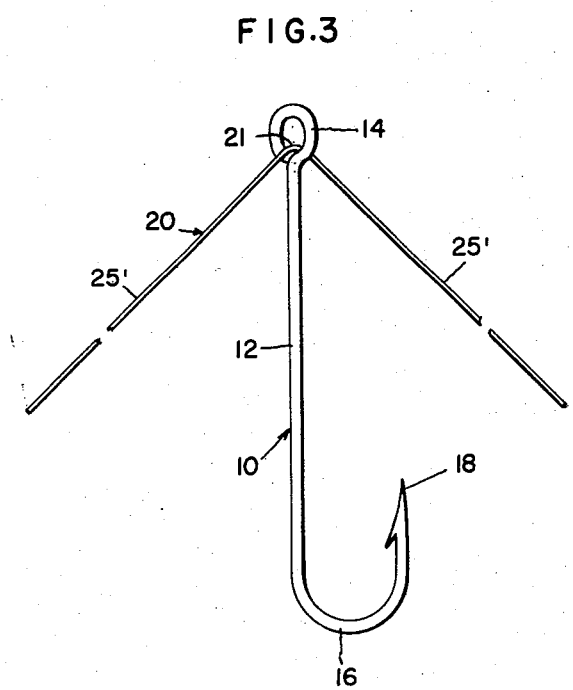
Fig. 3 is a view illustrating the first step in applying the weed deflector wire to the hook which has the eye thereof disposed in a new position, the hook being shown rotated approximately 45° from the front view position of Fig. 1.
Figure 4:
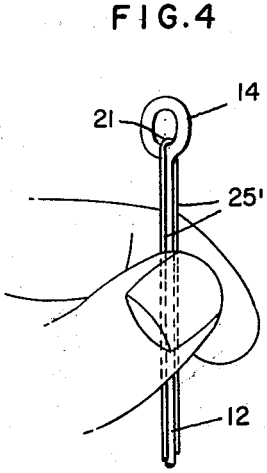
Fig. 4 illustrates a second step of fixing the ends of the wire and holding them in position against the sides of the hook shank preparatory to securing the ends with a binding of wire, gut, nylon thread or the like, the hook eye being in the same position as shown in Fig. 3.

Figs. 3 and 4 illustrate the initial steps in applying the weed deflector to the hook body. As shown in Fig. 3, the desired length of wire which is generally designated 20 is first bent midway between its ends to partially form the hereinbefore referred to bight, this partially formed bight or bend being designated 21′. Due to the fact that the eye 14 is oriented to lie in the plane of the hook point, it will be seen that when the wire has been disposed through the eye the two end portions 25′ which will later become the deflector fingers, will extend outwardly and downwardly adjacent to the lateral sides of the hook shank. These portions 25′ are then bent straight down against the lateral sides of the shank and held in position, as shown in Fig. 4, while the binding material is applied. It will thus be seen that after forming the initial partial bend in the wire the worker applying the deflector can very easily hold the two end portions down flat against the sides of the shank with the fingers spaced the proper distance from the eye 14 to permit the binding material to be applied.

Any suitable means may be employed for wrapping or binding material around the hook shank and around the portions of the wire adjacent to the eye, the binding 23 here illustrated being shown as having an end 23' bound down against the shank and against the portions 22 of the deflector and the other end of the binding material is drawn through the convolutions in a conventional well known manner of applying bindings of this type so that the said other end can be left in sufficient length to form the attaching snell 23".

After the binding has been applied to cover the desired length of the shank and of the down-bent portions 25', then such portions may be bent at the points 24, as hereinbefore stated, so as to dispose the major extent of the portions 25' in the outwardly and downwardly divergent relation illustrated in Fig. 2.

As the final step, the short terminal portions 26 may be formed or these may be formed at any other time as may suit the convenience of the worker.

While in the foregoing description reference has been made to an applied wrapping or binding material such as wire, gut or nylon thread it is, of course, also within the purview of the present invention to secure the short portions 22 against the hook shank by soldering or a like process.

It will be seen from the foregoing that by positioning the hook eye to lie in the plane of the hook point, the weed deflector wire may be easily placed in such position that after it has had its two portions secured to the hook shank by the binding material, or in any other manner, only one bend has to be made in each portion 25' to place the fingers in the desired position, thus eliminating the twisting and bending operations at present performed and consequently not only reducing the work and time for making the weedless hook but also avoiding the weakening of the wire which twisting and bending produces.

I claim:

1. A weedless fish hook comprising a shank having a closed eye at one end and a hook bill at the other end, said eye and hook bill lying in the same plane, a weed deflecting guard comprising a strand of resilient wire having a middle portion with a 180° bend therein extending through said closed eye, portions of said strand adjacent said bend lying contiguous to and parallel with the end portion of the shank adjacent the eye, the two portions of the guard adjacent to the 180° bend lying on opposite sides of the same single hook shank and being attached thereto and the axes of the shank and of the contiguous portions of the guard lying in a single plane perpendicular to the plane containing the eye and hook bill, and the strand having relatively long free end deflector finger forming portions arranged in outwardly divergent relation from the shank on opposite sides of the plane in which the hook bill and eye lie and terminating forwardly of and on opposite sides of the hook bill.

2. The invention according to claim 1, wherein the attachment of the two first mentioned portions of the guard to the shank is by means of a strand of material wrapped around the shank and the said contiguous portions.

3. The invention according to claim 1, wherein said finger forming portions include short straight terminal sections lying substantially parallel with the hook shank.

References Cited in the file of this patent

UNITED STATES PATENTS

| | | |
|---|---|---|
| D. 110,091 | Juul et al. | June 14, 1938 |
| 534,682 | Burgess | Feb. 26, 1895 |
| 678,296 | Clark | July 30, 1901 |
| 778,875 | Mathews | Jan. 3, 1905 |
| 832,929 | Stanley | Oct. 9, 1906 |
| 859,144 | Stanley | July 2, 1907 |
| 1,295,617 | Shannon | Feb. 25, 1919 |
| 2,074,258 | Fravel | Mar. 16, 1937 |
| 2,148,799 | Bilinski | Feb. 28, 1939 |
| 2,532,961 | Steen | Dec. 5, 1950 |
| 2,586,162 | Hayden | Feb. 19, 1952 |